(12) United States Patent
Chopra et al.

(10) Patent No.: US 10,210,050 B1
(45) Date of Patent: Feb. 19, 2019

(54) CONSISTENCY GROUP DRIVEN BACKUP

(71) Applicant: EMC Corporation, Hopkinton, MA (US)

(72) Inventors: Shelesh Chopra, Bangalore (IN); Vladimir Mandic, San Jose, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 223 days.

(21) Appl. No.: 14/139,688

(22) Filed: Dec. 23, 2013

(51) Int. Cl.
G06F 17/30 (2006.01)
G06F 11/14 (2006.01)

(52) U.S. Cl.
CPC .................. *G06F 11/1464* (2013.01)

(58) Field of Classification Search
CPC ............ G05F 11/1458; G05F 11/1464; G05F 11/1448; G05F 11/1451; G06F 11/1458; G06F 11/1448; G06F 11/1464; G06F 11/1451
See application file for complete search history.

(56) References Cited

U.S. PATENT DOCUMENTS

| | | | | |
|---|---|---|---|---|
| 6,151,604 A * | 11/2000 | Wlaschin | .......... | G06F 17/30315 707/741 |
| 7,543,121 B2 * | 6/2009 | Maki | .......... | G06F 3/065 711/162 |
| 8,245,078 B1 * | 8/2012 | Chatterjee | .......... | G06F 3/048 714/6.3 |
| 2004/0243945 A1 * | 12/2004 | Benhase | .......... | G06F 3/0482 715/853 |
| 2006/0069865 A1 * | 3/2006 | Kawamura | .......... | G06F 11/2064 711/114 |
| 2006/0288183 A1 * | 12/2006 | Boaz | .......... | G06F 11/1451 711/164 |
| 2007/0006018 A1 * | 1/2007 | Thompson | .......... | G06F 11/1466 714/6.12 |
| 2007/0055716 A1 * | 3/2007 | Mikami | .......... | G06F 17/30215 707/999.204 |
| 2008/0294859 A1 * | 11/2008 | Nguyen | .......... | G06F 11/1451 711/162 |
| 2009/0043829 A1 * | 2/2009 | Mizuno | .......... | G06F 11/1456 |
| 2010/0082925 A1 * | 4/2010 | Irisawa | .......... | G06F 11/1461 711/162 |
| 2010/0257326 A1 * | 10/2010 | Otani | .......... | G06F 11/1451 711/162 |
| 2011/0099345 A1 * | 4/2011 | Mitsui | .......... | G06F 11/2069 711/162 |

(Continued)

*Primary Examiner* — Ashish Thomas
*Assistant Examiner* — Jedidiah P Ferrer
(74) *Attorney, Agent, or Firm* — Womble Bond Dickinson (US) LLP

(57) ABSTRACT

Methods and systems are described for grouping one or more save sets into a consistency group, the save sets being located across one or more client computers in a network, and for performing backup and recovery operations over a consistency group. According to one embodiment, a consistency group operation request is received by a backup system on a main server, the request indicating that a backup or recovery operation is to be performed over the consistency group. In response, the backup system retrieves information regarding the consistency group's save sets, and sends a save set operation request to each client computer instructing the client computer to perform the backup or recovery operation on any save sets within the consistency group.

23 Claims, 7 Drawing Sheets

(56) References Cited

U.S. PATENT DOCUMENTS

| | | | | |
|---|---|---|---|---|
| 2011/0258402 A1* | 10/2011 | Nakajima | ........... | G06F 11/2069 711/154 |
| 2012/0072685 A1* | 3/2012 | Otani | .................. | G06F 11/1451 711/162 |

* cited by examiner

Fig. 5a

| Consistency Group Name | Consistency Group Information List | |
|---|---|---|
| | Included Save Set Names | Client Computer Names |
| CCC | XX | Client_01 |
| | YY | Client_01 |
| | ZZ | Client_02 |
| | AA | Client_03 |
| | BB | Client_03 |
| GGG | XX | Client_01 |
| | FF | Client_04 |

501 — Consistency Group Name
503 — Consistency Group Information List
217

Fig. 5b

| Name | Client Name | Set Data | Set Type | Group Includes |
|---|---|---|---|---|
| XX | Client_01 | C:\ | Physical (Save Set) | NA |
| YY | Client_01 | D:\ | Physical (Save Set) | NA |
| ZZ | Client_02 | D:\data\ | Physical (Save Set) | NA |
| AA | Client_03 | F:\, G:\ | Physical (Save Set) | NA |
| BB | Client_03 | J:\file.txt | Physical (Save Set) | NA |
| FF | Client_04 | G:\ | Physical (Save Set) | NA |
| CCC | NA | NA | Virtual (C. Group) | XX;YY;ZZ;AA;BB |
| GGG | NA | NA | Virtual (C. Group) | XX;FF |

521  523  525  527  529
217

CONSISTENCY GROUP DRIVEN BACKUP

FIELD OF THE INVENTION

Embodiments of the present invention relate generally to computer networks and computer backups. More particularly, embodiments of the invention relate to consistency group backups.

BACKGROUND

Organizations are increasingly deploying large networks and network-based applications to support internet and intranet technologies. A key benefit of adopting such large networks and network-based applications are scalability of resources, accessibility, and improved reliability of operations. It is often difficult, however, to use existing backup methods to coordinate a backup or restoration of multiple machines in such a network, or to back up all machines relevant to a specific network-based application concurrently.

One approach to backup and restore multiple client computers in a network is to handle each backup or restore operation separately for each client computer to be backed up in the network. This typically means installing and running a backup agent on each client computer that is to be backed up. Such a backup agent is typically configured to back up or recover files contained in a save set on a single client computer, the save set being a collection of data files on the client computer that are backed up and restored together by the backup agent. Handling the backup separately for each client computer is resource intensive, difficult to perform concurrently, and becomes unwieldy from a management perspective as the number of client computers in the network increases.

BRIEF DESCRIPTION OF THE DRAWINGS

Embodiments of the invention are illustrated by way of example and not by way of limitation in the figures of the accompanying drawings in which like references indicate similar elements. It should be noted that different references to "an" or "one" embodiment in this disclosure are not necessarily to the same embodiment, and such references mean at least one.

FIG. 5a is one embodiment of the consistency group information store containing sample data regarding multiple consistency groups.

FIG. 5b is another embodiment of the consistency group information store containing sample data regarding multiple save sets and consistency groups.

DETAILED DESCRIPTION

Figure 1:
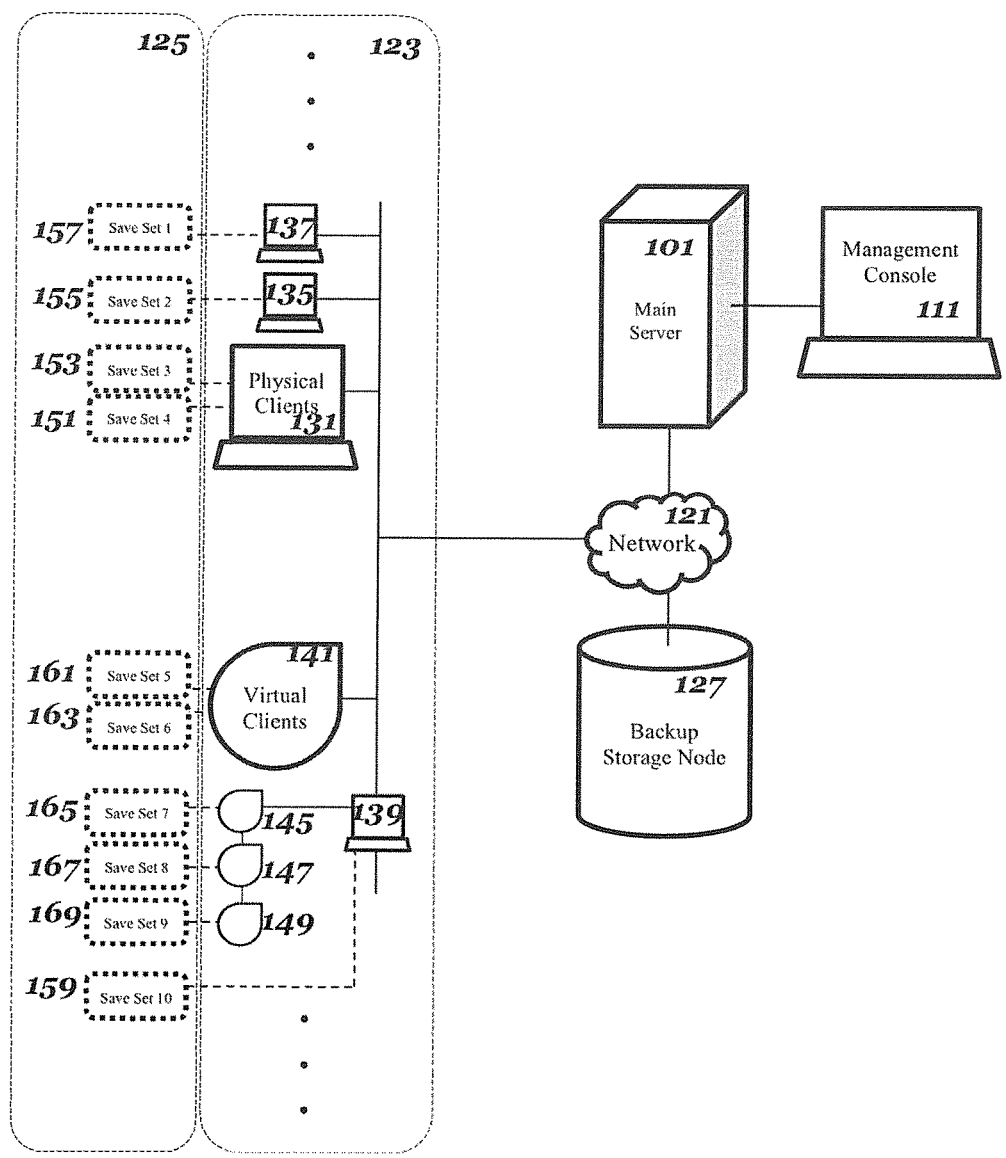
FIG. 1 is a diagram of one embodiment of a set of networked client computers to be backed up, and a backup system.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Various modifications and changes can be made to the embodiments without departing from the broader spirit and scope of the invention as set forth in the appended claims. The specification and drawings are, accordingly, to be regarded in an illustrative rather than a restrictive sense.

The invention can be implemented in numerous ways, including as a process, an apparatus, a system, a composition of matter, a computer readable medium such as a computer readable storage medium or a computer network wherein program instructions are sent over optical or communication links. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

Reference in the specification to a "save set" means one or more data files or data file locations (such as file directories) stored on a client computer that have been collectively assigned a save set name. A data file may be any type of data file, such as a document file, an image file, an audio file, a video file, a multimedia file, a database or other data structure, a program source code file, an executable program file, a website front-end or back-end component file, a markup file, or any other type of data file that may be stored in a non-transitory computer readable medium.

Reference in the specification to a "consistency group" means one or more save sets that have been collectively assigned a consistency group name. In some embodiments, one save set may belong to multiple consistency groups.

Reference in the specification to "backup operations" or "backup and recovery operations" means a wide array of operations that may include but are not limited to backing up data or recovering backed up data. These terms may also refer, for example, to destructively rolling back to a previously backed up state, purging or deleting backups, editing a backup retention and expiration policy, cloning a backup, staging (cloning to another device) a backup, renaming or otherwise editing metadata for a backup, receiving or sending a report or notification relating to the status of a backup operation, searching for specific data, and searching for a specific backup. This list of possible backup operations is exemplary and not intended to be exhaustive.

The present invention deals generally with grouping one or more save sets into a consistency group. The present invention also deals generally with running a backup or recovery operation over all of the save sets in a consistency group.

FIG. 1 is a diagram of one embodiment of a set of networked client computers to be backed up, and a backup system. The embodiment of FIG. 1 illustrates a plurality of client computers 123. Each client computer of the set of client computers 123 may be any type of client computer, such as a server, a personal computer (e.g., desktops, laptops, and tablets), a virtual machine, a Web appliance, a network device, or any other machine with similar capabilities. In FIG. 1, the client computers 123 are connected to a network 121. Network 121 may be any type of network, such as a local area network (LAN), a wide area network (WAN) such as Internet, a corporate intranet, a metropolitan area network (MAN), a storage area network (SAN), a bus, or a combination thereof, wired and/or wireless.

In addition to the client computers 123, the network 121 is also shown to connect to main server 101 and storage node 127. In other embodiments, the network 121 may be connected to other systems as well.

Figure 6:
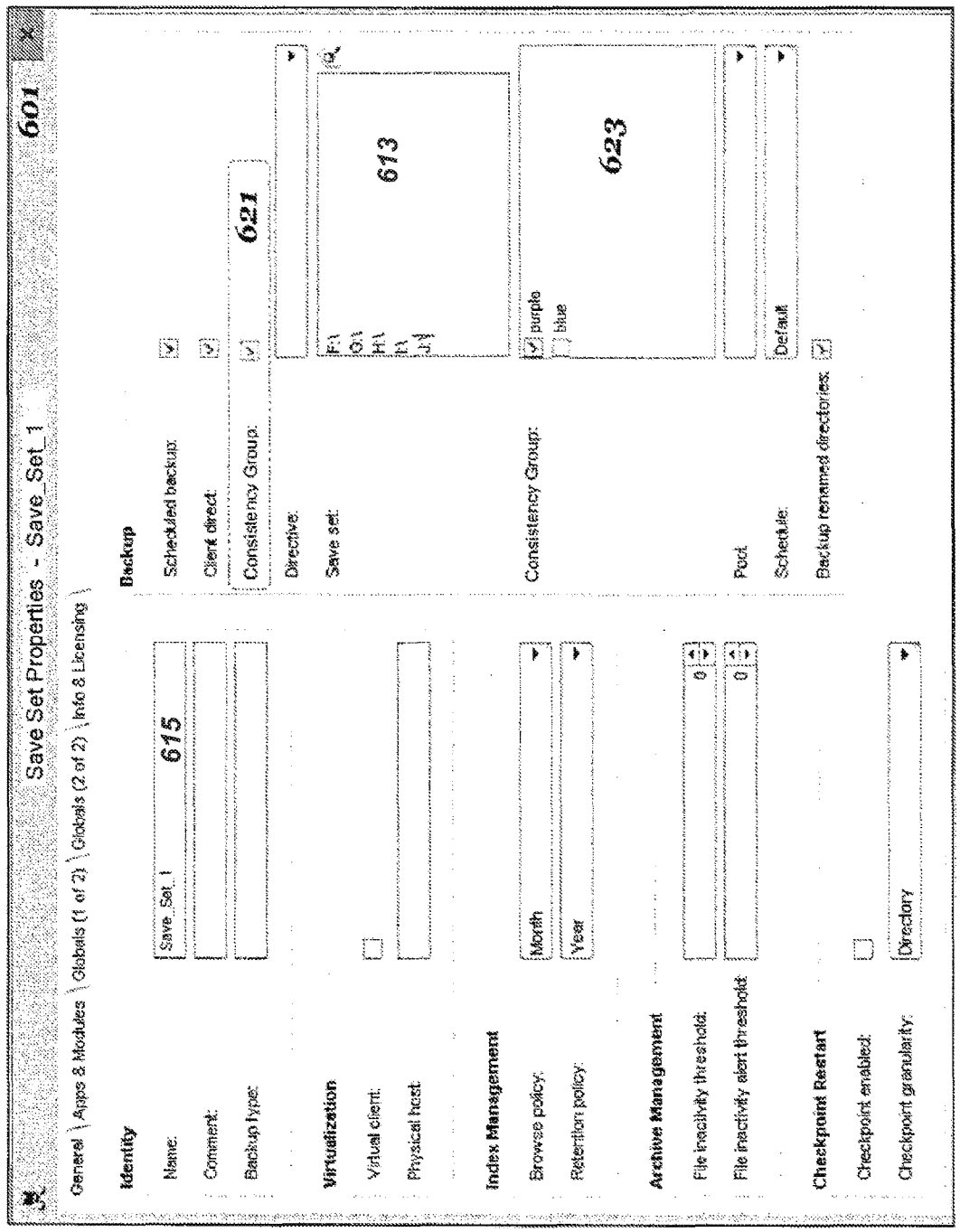
FIG. 6 is one embodiment of a user interface configured to create a save set and present an option to include the save set within a consistency group.

The embodiment of FIG. 1 illustrates the main server 101 as connected to the network 121. The main server 101 may be any type of device, such as a server, a personal computer (e.g., desktops, laptops, and tablets), a virtual machine, a Web appliance, a network device, a file server, or any other machine with similar capabilities. In some embodiments, the main server 101 receives requests to perform backup and recovery operations over a consistency group, or over a save set. This is diagrammed further as Block 401 of FIG. 4. In some embodiments, the main server 101 receives requests to create or edit a consistency group and routes them to internal modules such as the backup system 213, described further in relation to FIG. 2. One embodiment of the consistency group creation process is diagrammed further in FIG. 3. In some embodiments, the main server 101 receives requests to create or edit a save set and routes them to internal modules such as the backup system 213. Both the consistency group creation and editing request and the save set creation and editing requests may be the result of a user interface as illustrated in FIG. 6. In some embodiments, the main server 101 executes a backup system 213. Embodiments of the main server 101 are described in more detail in reference to FIG. 2.

The embodiment of FIG. 1 illustrates the management console 111 as connected to the main server 101. The management console 111 is a component that is capable of receiving input from a user. In some embodiments, inputs may be gathered through a user interface such as the user interfaces illustrated in FIG. 6 and FIG. 7. In some embodiments, the management console 111 is the origin of requests to perform backup and recovery operations over a consistency group, or over a save set (as described in Block 401 of FIG. 4). In some embodiments, the management console 111 is the origin of requests to create or edit a consistency group (as described in Block 301 of FIG. 3) or a save set (as exemplified by the user interface of FIG. 6). In FIG. 1, the management console 111 is connected to the main server 101. This connection may be through any type of network such as a local area network (LAN), a wide area network (WAN) such as Internet, a corporate intranet, a metropolitan area network (MAN), a storage area network (SAN), a bus, or a combination thereof, wired and/or wireless. In one embodiment, the management console 111 is connected to the main server 101 through the network 121.

The management console 111 may be any type of device, such as a server, a personal computer (e.g., desktops, laptops, and tablets), a virtual machine, a "thin" client, a personal digital assistant (PDA), a Web appliance, a file server, a gaming device, a network device, a media player, a mobile phone (e.g., Smartphone), or any other machine with similar capabilities. In an alternate embodiment, the management console 111 is not a separate machine from the main server 101, but instead is simply one or more hardware components of the main server that are configured to direct input into the main server 101 and/or display output from the main server 101. These components may include, but are not limited to, a keyboard, a virtual keyboard, a mouse, a touchpad, a tilt wheel, a scroll ball, a trackball, a pointing stick, a joystick, a wheel, one or more physical switches, a touchscreen, computer monitor, a television screen, a touch screen, tactile electronic display, a Braille screen, a Cathode ray tube (CRT), a Storage tube, a Bistable display, Electronic paper, Vector display, Flat panel display, Vacuum fluorescent display (VF), Light-emitting diode (LED) displays, Electroluminescent display (ELD), Plasma display panels (PDP), Liquid crystal display (LCD), Organic light-emitting diode displays (OLED), a projector, a Head-mounted display, a punchcard, a printer, any other input or output device, or any combination thereof.

In another alternate embodiment, the management console 111 is entirely omitted. The origin of requests to perform backup and recovery operations over a consistency group or over a save set (as described in Block 401 of FIG. 4) or of requests to create or edit a consistency group (as described in Block 301 of FIG. 3) or a save set (as exemplified by the user interface of FIG. 6) can instead be one of the client computers 123 or an automated scheduling software or hardware unit within the main console 101.

The embodiment of FIG. 1 also illustrates the backup storage node 127 as connected to the network 121. The backup storage node 127 is where the backups created by the processes described in the present invention are stored. Backup storage node 127 may be a storage server used for any of various different purposes, such as to provide multiple users with access to shared data and/or to back up mission critical data. Backup storage node 127 may be, for example, a file server (e.g., an appliance used to provide NAS capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Backup storage node 127 may have a distributed architecture, or all of its components may be integrated into a single unit. Backup storage node 127 may be implemented as part of an archive and/or backup storage system such as a de-duplication storage system available from EMC® Corporation of Hopkinton, Mass.

The machine or machines that make up backup storage node 127 may include one or more storage or memory units, including hard disk drives, optical drives, tape drives, random access memory (RAM), read-only memory (ROM), programmable read-only memory (PROM), Redundant Arrays of Independent Disks (RAID), flash memory, magneto-optical memory, holographic memory, memristor-based memory, bubble memory, magnetic drum, memory stick, Mylar® tape, smartdisk, thin film memory, zip drive, or similar storage or memory hardware.

The backup storage node 127 may include hardware or software modules that conduct backup functions such as deduplication. In one embodiment, backup storage node 127 may include a deduplication storage module that is configured to segment a data file to be stored in the backup storage node 127 into multiple segments according to a variety of segmentation policies or rules. Such a deduplication storage module may be a hardware or software module, and is configured to store a segment in a storage unit if the segment has not been previously stored in the storage unit. Data stored in the storage units may be stored in a compressed form (e.g., lossless compression: Huffman coding, Lempel-Ziv Welch coding; delta encoding: a reference to a segment plus a difference; subsegmenting: a list of subsegments or references to subsegments, etc.). Different storage units within the backup storage node 127 may use different compression methods (e.g., main or active storage unit from other storage units, one storage unit from another storage unit, etc.).

In another alternate embodiment, the backup storage node 127 may be a cloud computing network storage system. In another alternate embodiment, the backup storage node 127 may not exist as a separate machine or set of machines connected via the network 121, but the backups may instead be stored on a storage unit located on the main server 101, on the management console 111, or on the client machines 123.

The embodiment of FIG. 1 illustrates that each of the save sets 125 are located on one of the clients 123. For a save set to be "located on" or "contained on" a client means that that the save set consists of one or more data files or data file locations (such as file directories) stored on that particular client computer that have been collectively assigned a save set name. The save set name and the information about which data files or data file locations it corresponds to on that client computer may be stored on the client computer as well, in one embodiment. In another embodiment, this information may instead be stored on the main server 101. In particular, FIG. 5b illustrates an embodiment in which this information is stored through the consistency group manager 223 in a consistency group information store 227, described in further detail in reference to FIG. 2. In another embodiment, this information may be stored on the management console 111, on the backup storage node 127, or on another machine connected to the network 121 that is not pictured in FIG. 1.

In the embodiment of FIG. 1, the following save set assignments are illustrated. Save Set 1 157 is located on client computer 137, Save Set 2 155 is located on client computer 135, Save Set 3 153 and Save Set 4 151 are both located on client computer 131. Save Set 5 161 and Save Set 6 163 are located on client computer 141, Save Set 7 165 is located on client computer 145, Save Set 8 167 is located on client computer 147, Save Set 169 is located on client computer 149, and Save Set 10 159 is located on client computer 139.

The client computers 123 may be physical computers, such as physical client computers 131, 135, and 137. Alternately, the client computers 123 may be virtual machines, such as virtual client computers 141, 145, 147, and 149. Alternately, the client computers 123 may be a collection of client computers including both physical client computers and virtual client computers, as illustrated in FIG. 1.

Not every client computer in the network must contain a save set, though each of the client computers 123 illustrated in the embodiment of FIG. 1 are illustrated as containing at least one. In an alternate embodiment, a client computer may exist that does not have a save set. A client computer may also have more than one save set. For example, physical client computer 131 is depicted as containing both save set 3 153 and save set 4 151; similarly, virtual client computer 141 is depicted as containing both save set 5 161 and save set 6 163. In the case of virtual client computers, both the virtual client computer and the physical client computer that it is run from may have their own separate save sets. For instance, virtual client computers 145, 147, and 149 each contain a save set, and are illustrated as being run from physical client computer 139, which contains its own save set 10 159.

In one embodiment, the client computers 123 may be collection of servers that work in concert to support an application that runs on the Internet or that runs on an intranet. For example, the application could be an application based on Sharepoint, Oracle, VDI, SAP, Exchange, SQL server, or similar applications.

Each client computer of the client computers 123 may store any form of data files and may run any form of application that may need to be backed up. The save sets of client computers may include any type of data file, such as a database or other data structure, a program source code file, an executable program file, a website front-end or back-end component file, a markup file, a configuration file, or any other type of data file. As previously noted, the data file may also be a document file, an image file, an audio file, a video file, a multimedia file, or any other type of data file that may be stored in a non-transitory computer readable medium.

Figure 2:
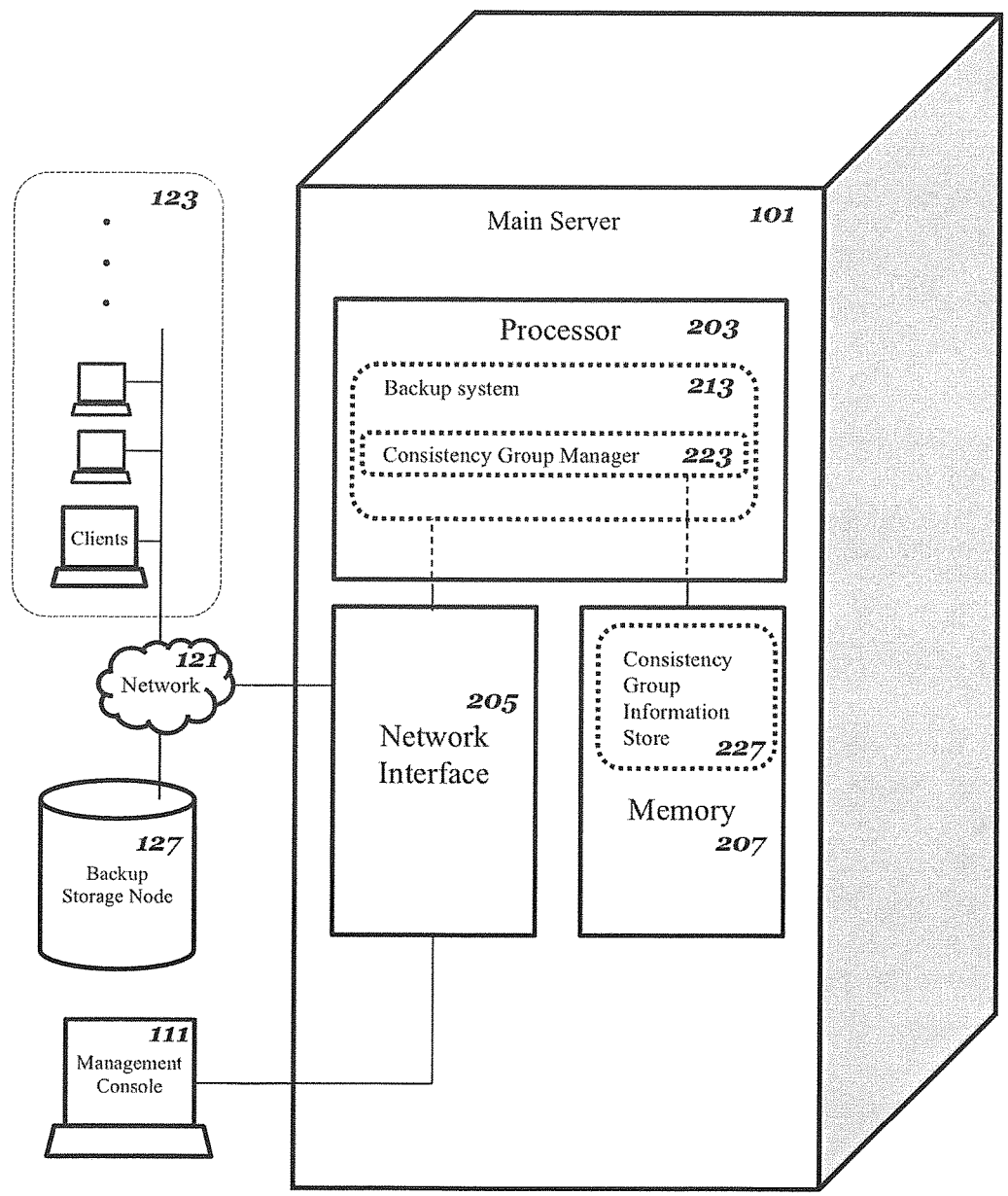
FIG. 2 is a diagram of one embodiment of the main server.

FIG. 2 is a diagram of one embodiment of the main server 101. In one embodiment, the main server 101 handles the grouping of one or more save sets into a consistency group, and the running of backup and recovery operations across the consistency group. In alternate embodiments, one or both of those functions are instead handled by another machine, such as the management console 111, the backup storage node 127, or one of the client computers 123. The main server includes, but is not limited to, a network interface 205, a memory 207, and a processor 203 that is coupled to the network interface 205 and the memory 207. In alternate embodiments, the main server 101 may contain other hardware components as well.

The network interface 205 may be a wired interface (such as a bus or port), a wireless interface, or a combination of the two. The network interface 205 is configured at least to connect to the network 121. In other embodiments, the network interface 205 may be configured to connect to other networks as well.

The memory 207 may include one or more storage or memory units, including hard disk drives, optical drives, tape drives, random access memory (RAM), read-only memory (ROM), programmable read-only memory (PROM), Redundant Arrays of Independent Disks (RAID), flash memory, magneto-optical memory, holographic memory, memristor-based memory, bubble memory, magnetic drum, memory stick, Mylar® tape, smartdisk, thin film memory, zip drive, or similar storage or memory hardware.

In one embodiment, the processor 203 may be configured to execute a backup system 213. The backup system 213 may be a centralized backup software system, such as the NetWorker® software available from EMC® Corporation of Hopkinton, Mass. The backup system 213 is capable of interacting with the network interface 205. In one embodiment, the backup system 213 is also capable of interacting with the management console 111 directly. The backup system 213 may be configured to receive requests to perform backup and recovery operations over a consistency group, or over a save set (as described in Block 401 of FIG. 4). The backup system 213 may also be configured to receive requests to create or edit a consistency group (as described in Block 301 of FIG. 3) or a save set (as exemplified by the user interface of FIG. 6). In some embodiments, the backup system 213 is also configured to send requests to client computers to perform backup and recovery operations over a save set (as in processes 403 and 451 of FIG. 4). In some embodiments, the backup system 213 is not executed from the main server 101. For instance, the backup system 213 may be executed from management console 111, the backup storage node 127, or one of the client computers 123.

In some embodiments, the backup system 213 includes or interfaces with the consistency group manager 223. The consistency group manager 223 is configured to keep track of information about consistency groups, such as which save sets are included within each consistency group and which client computers those save sets are located on. In some embodiments, the consistency group manager 223 is executed from the processor 203 of the main server 101. In other embodiments, the consistency group manager 223 is not executed from the main server 101. For instance, the consistency group manager 223 may be executed from management console 111, the backup storage node 127, or one of the client computers 123. In some embodiments, the backup system 213 is executed from a separate machine than the consistency group manager 223 is executed from.

In some embodiments, the consistency group manager 223 includes or interfaces with a consistency group information store 227. The consistency group manager 223 uses the consistency group information store 227 to store and retrieve consistency group names and consistency group information lists, as described in Block 321 of FIG. 3 and in Block 421 of FIG. 4, respectively.

The consistency group information store 227 may be a database, a table, a list, a matrix, an array, an arraylist, a tree, a hash, a flat file, an image, a queue, a heap, a memory, a stack, a set of registers, or any data structure that may hold data about one or more entities. Some embodiments of the consistency group information store 227 are provided in FIG. 5a and FIG. 5b.

In some embodiments, the consistency group information store 227 is stored in the memory 207, or some other storage unit, of the main server 101. In other embodiments, the consistency group information store 227 is not located on the main server 101. For instance, the consistency group information store 227 may be located on the management console 111, the backup storage node 127, or one of the client computers 123. In some embodiments, the consistency group manager 223 and the consistency group information store 227 are not located on the same machine.

Figure 3:
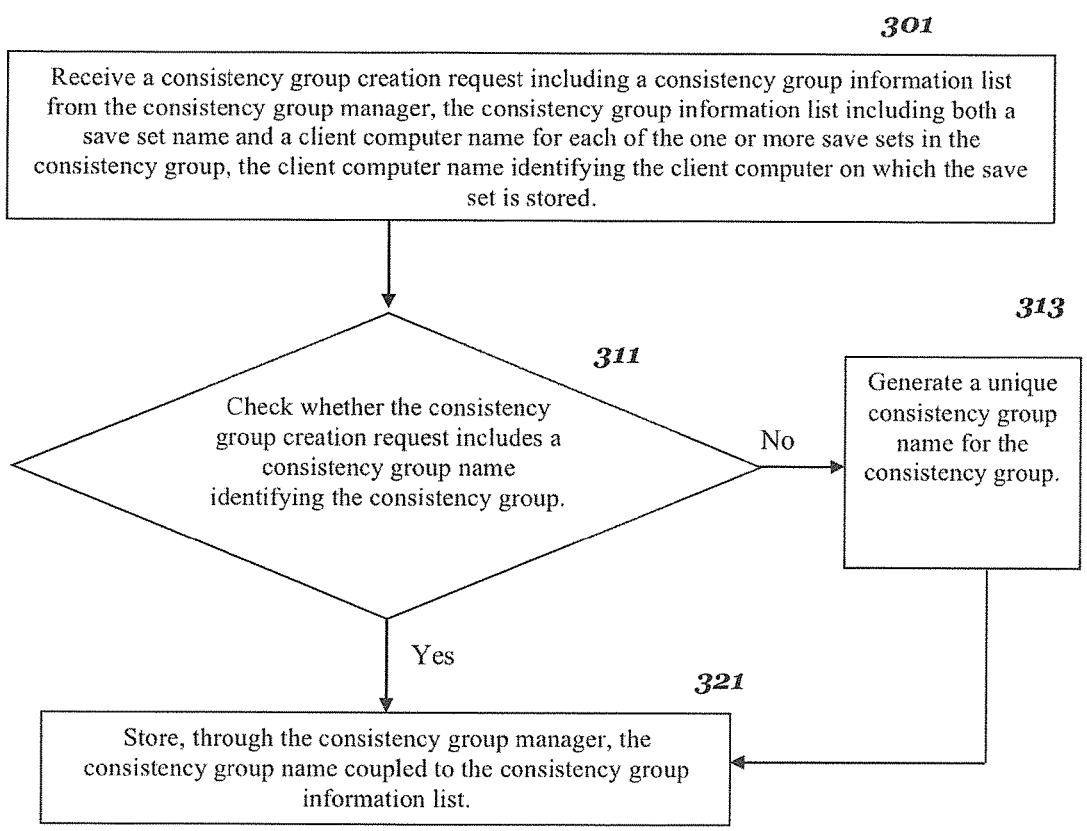
FIG. 3 is a flow chart of one embodiment of a process for the creation of a consistency group by the backup system.

FIG. 3 is a flow chart of one embodiment of a process for the creation of a consistency group by the backup system 213. The process for the creation of a consistency group by the main server 101 begins with a process illustrated in the flow chart of FIG. 3. The consistency group creation process begins when the backup system 213 receives a consistency group creation request (Block 301). The consistency group creation request includes a consistency group information list. The consistency group information list includes both a save set name and a client computer name for each of the one or more save sets in the consistency group, the client computer name identifying the client computer on which the save set is stored. In one embodiment, the consistency group creation request originates from the management console 111. It the request originates from the management console 111, the consistency group creation request may have been triggered by a user interface interaction. In one embodiment, this user interface is a selection screen listing of all save sets already existing on client computers 123 connected to the network 121, and the user interface interaction is the selection of a subset of that listing, the subset being the group of save sets to be included in the consistency group. Alternately, the consistency group creation request may have been part of a save set creation process, as illustrated in the user interface of FIG. 6. If it was part of a save set creation process as illustrated in FIG. 6, then the consistency group creation request may originate from the management console 111, or, alternately, from one of the client computers 123. In another alternate embodiment, the consistency group creation request originates from a software or hardware module within the main server 101, such as an automated timer function.

The process of the flow chart in FIG. 3 continues with a check performed by the consistency group manager 223 regarding whether the consistency group creation request includes a consistency group name identifying the consistency group (Block 311). If the consistency group creation request does not include a consistency group name, the consistency group manager 223 proceeds 313 to generate a unique consistency group name for the consistency group. In an alternate embodiment, processes 311 and 313 could instead be performed by the entity that is the origin of the consistency group creation request, which, as noted previously, may be the management console 111, one of the clients 123, or a hardware or software module within the main server 101.

Once it is certain that a consistency group name exists for the consistency group, the consistency group creation process continues with the consistency group manager 223 storing, in the consistency group information store 227, the consistency group name coupled to the consistency group information list (Block 321). The consistency group information store 223 may be configured to store one or more pairings of consistency group names and their respective consistency group information lists. Two possible embodiments of the consistency group information store 227 are illustrated in FIG. 5a and in FIG. 5b.

While FIG. 3 illustrates the process of creating a consistency group, there may be a similar process (not illustrated) for editing an existing consistency group after it has been created. Such edit operations may include adding a save set to the consistency group, removing a save set from the consistency group, renaming the consistency group, deleting the consistency group altogether without deleting the save sets within it, and similar operations whose only effect on the save sets 125 in the network relates to whether or not they are included within the consistency group. In one embodiment, such operations are performed by the consistency group manager 223 editing the data stored in the consistency group information store 227 to reflect any changes requested.

Figure 4:
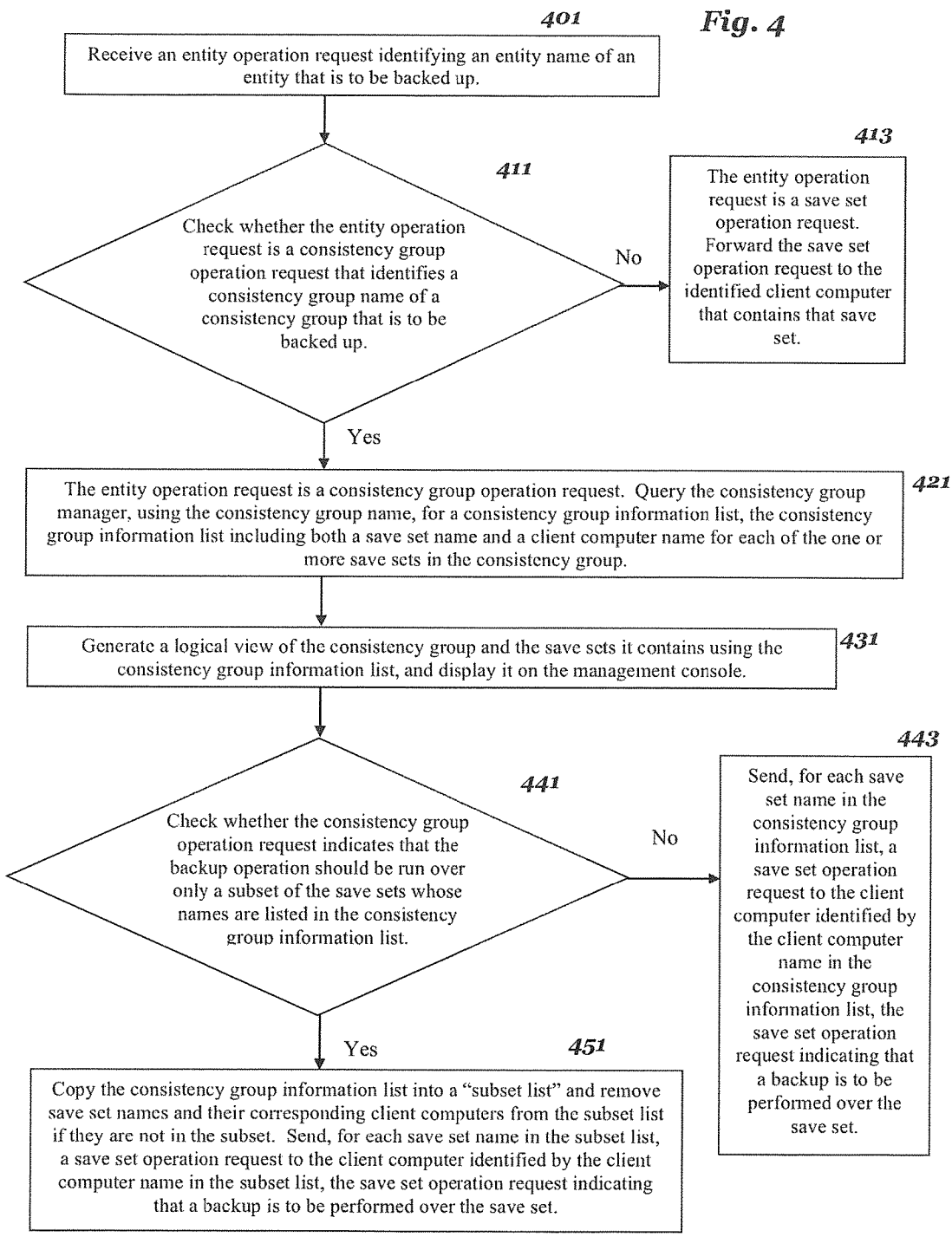
FIG. 4 is a flow chart of one embodiment of a process for the performance of a backup operation by the backup system.

FIG. 4 is a flow chart of one embodiment of a process for the performance of a backup operation by the backup system 213. The backup operation process begins with is the backup system 213 receiving an entity operation request identifying an entity name of an entity that is to be backed up (Block 401). The entity name may be a consistency group name, identifying a consistency group to be backed up, or a save set name, identifying a save set to be backed up. In one embodiment, the entity operation request originates from the management console 111. In an alternate embodiment, the entity operation request originates from one of the clients 123. In some embodiments, the entity operation request may have been triggered by a user interface interaction, such as the user interface interaction illustrated in FIG. 7. In another embodiment, the entity operation request originates from a software or hardware module within the main server 101, such as an automated timer function.

The backup operation process continues with the backup system 213 checking whether the entity operation request is a consistency group operation request that identifies a consistency group name of a consistency group that is to be backed up (Block 411). If the entity operation request does not identify a consistency group name, then the entity name must instead be a save set name that identifies instead a save set to be backed up 413. If the entity operation request identifies the entity operation request as a save set operation request 413, then the backup system 213 forwards the save set operation request to the client computer that contains that save set, requesting that client computer to perform the backup operation over that save set. In one embodiment, the save set operation request may include a client computer name that identifies the client computer that contains that save set. In an alternate embodiment, the save set operation request of step 413 may omit including the client computer name, in which case the backup system 213 may instead query the consistency group manager 223 to identify the client computer name. In another alternate embodiment, If the save set operation request of step 413 omits including the client computer name, the backup system 213 may instead query each of the client computers 123 regarding whether the client computer contains a save set identified by that save set name until it receives a positive response from one of the client computers. The backup system 213 then forwards the save set operation request to the client computer.

If the check (Block 411) identifies that the entity operation request was in fact a consistency group operation request that identifies a consistency group name of a consistency group that is to be backed up, backup operation process continues 421 with the backup system querying the consistency group manager 223 for more information about the consistency group identified by that consistency group name. More specifically, the backup system 213 queries the consistency group manager 223, using the consistency group name, for a consistency group information list. As noted previously, the consistency group information list includes both a save set name and a client computer name for each of the one or more save sets in the consistency group, the client computer name identifying the client computer on which the save set is stored. The consistency group manager 223 retrieves the consistency group information list from the consistency group information store 227. Two possible embodiments of the consistency group information store 227 are illustrated in FIG. 5a and FIG. 5b, but do not constitute a comprehensive listing of all possible embodiments.

In one embodiment, backup operation process continues with the backup system 213 generating a logical view of the consistency group and the save sets it contains using the consistency group information list, and displaying it on the management console 111 (Block 431). This logical view may be text-based, or it may be a graphical tree or map structure, or it may be any other view that illustrates the save sets included within a consistency group. In some embodiments, the logical view also illustrates the client computers 123 and their connection to the network 121. In other embodiments, the logical view need not be generated or displayed at all.

The backup operation process continues with the backup system 213 checking whether the consistency group operation request indicates that the backup operation should be run over only a subset of the save sets whose names are listed in the consistency group information list (Block 441).

Figure 7:
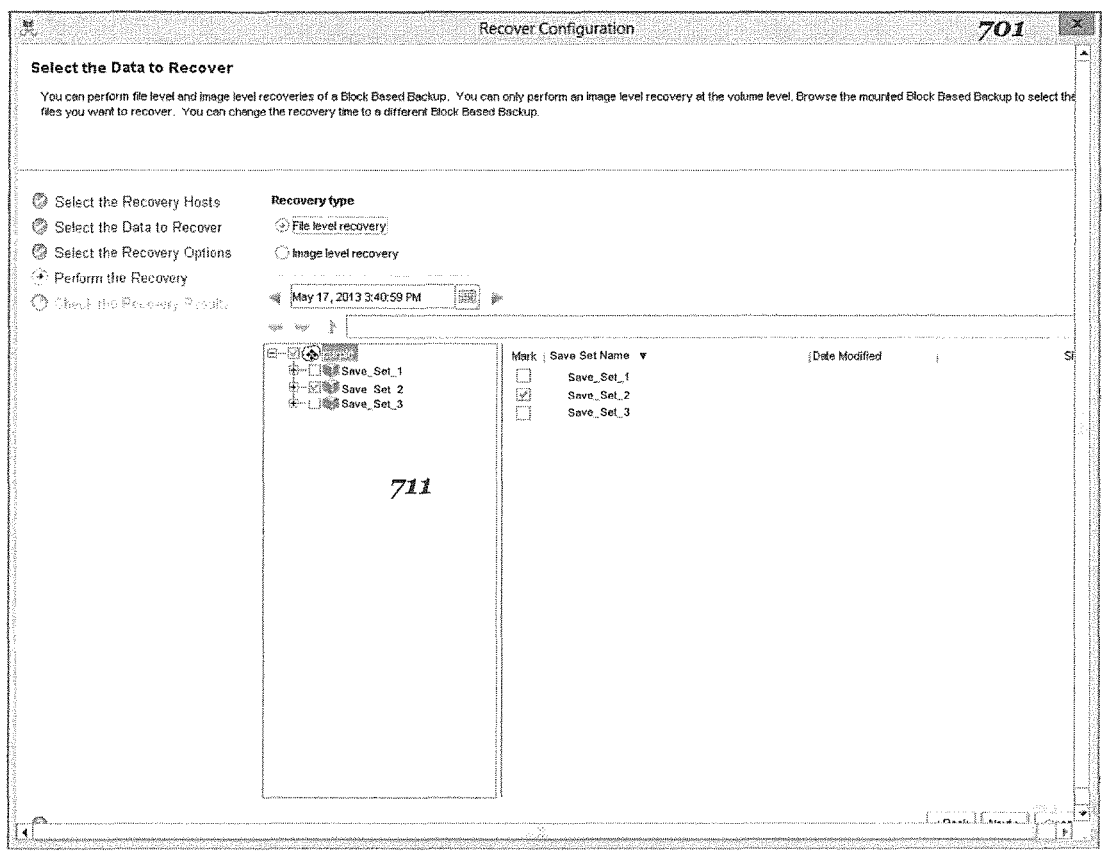
FIG. 7 is one embodiment of a user interface configured to request a recovery operation over a consistency group and present an option to instead request the recovery operation over a subset of save sets within the consistency group.

In some embodiments, the consistency group operation request specifies a subset of the consistency group via a user interface selection made from the management console 101, as illustrated in FIG. 7. In some embodiments, this check may be skipped, as the option to specify a subset of the consistency group may not exist in such embodiments.

If the backup system 213 determines that the consistency group operation request did not indicate that the backup operation should be run over only a subset of the save sets whose names are listed in the consistency group information list, then, for each save set name in the consistency group information list, the backup system 213 sends a save set operation request to the client computer identified by the client computer name in the consistency group information list, the save set operation request indicating that a backup is to be performed over the save set (Block 443).

If the backup system 213 determines that the consistency group operation request did indicate that the backup operation should be run over only a subset of the save sets whose names are listed in the consistency group information list, then this process is slightly modified. In one embodiment, the backup system 213 then copies the consistency group information list into a "subset list" and removes any save set names and their corresponding client computers from the subset list if they are not in the subset. After that, for each save set name in the subset list, the backup system 213 sends a save set operation request to the client computer identified by the client computer name in the subset list, the save set operation request indicating that a backup is to be performed over the save set (Block 451). In an alternate embodiment, the backup system 213 does not actually create a separate subset list, but merely flags the save sets included within the subset in the consistency group, and only sends the save set operation requests to the client computers containing those save sets. These flags may be stored in a column in the original consistency group information list, or alternately, in a separate data file located on the main server 101, the management computer 111, the backup storage node 127, or one or more of the client computers 123.

While the flow diagrams in FIG. 3 and FIG. 4 show a particular order of operations performed by certain embodiments of the invention, it should be understood that such order is exemplary (e.g., alternative embodiments may perform the operations in a different order, combine certain operations, overlap certain operations, etc.).

FIG. 5a is one embodiment of the consistency group information store 227 containing sample data regarding multiple consistency groups. In one embodiment, the consistency group information store 227 stores the consistency group name of each consistency group in one column 501, and stores a consistency group information list consisting of save set names and corresponding client computer names in the second column 503.

In the embodiment of FIG. 5a, when the backup system 213 queries the consistency group manager 223 for the consistency group information list corresponding to a given consistency group name as per step 421 of the flow chart of FIG. 4, the consistency group manager 223 starts by locating the consistency group name in the left-most column 501 of the consistency group information store 227. The corresponding consistency group information list is retrieved by the consistency group manager 223 simply by collecting the entries in the consistency group information list column 503 of the consistency group information store 227 that are in the same row as the consistency group name. The consistency group manager 223 then sends this list back to the backup system 213 in response to the backup system 213's query requesting a consistency group information list as described in Block 421 of FIG. 4. When the backup system 213 receives this consistency group information list, this completes process described in Block 421 of FIG. 4.

FIG. 5b is another embodiment of the consistency group information store 227 containing sample data regarding multiple save sets and consistency groups.

The example save sets and consistency groups listed in FIG. 5b are the same as those listed in FIG. 5a. In the embodiment of FIG. 5b, the "Name" column 521 of the consistency group information store 227 lists both save set names and consistency group names. The names XX, YY, ZZ, AA, BB, and FF in the "Name" column 521 are save set names, while the names CCC and GGG in the "Name" column 521 are consistency group names.

The "Client Name" column 523 of the consistency group information store 227 is only used for save sets, and identifies the name of the client computer where the named save set is located. The "Set Data" column 525 of the consistency group information store 227 is used only for save sets, and includes a list of the files (see save set BB, which contains a text file) or file locations (see save sets XX, YY, ZZ, AA, FF) located on the client computer that are included in the save set. A save set may include multiple files or file locations, as illustrated by save set AA in FIG. 5b, which is depicted as containing two file directories. The "Set Type" column 527 of the consistency group information store 227 identifies whether the row refers to a save set or a consistency group. The "Group Includes" column 529 of the consistency group information store 227 is only used for consistency groups, and contains a simple list of save set names that the consistency group contains. In one embodiment, a save set may belong to one or more consistency groups; for example, save set XX is included in both consistency group CCC and consistency group GGG. In an alternate embodiment, each save set could be limited to belonging to only one consistency group.

In the embodiment of FIG. 5b, when the backup system 213 queries the consistency group manager 223 for the consistency group information list corresponding to a given consistency group name as described in Block 421 of the flow chart of FIG. 4, the consistency group manager 223 starts by locating the consistency group name in the "Name" column 521 of the consistency group information store 227. The consistency group manager 223 then locates the "Group Includes" list that is in column 529 of the consistency group information store 227 in the same row as the consistency group name. The consistency group manager 223 then returns to the "Name" column 521 of the consistency group information store 227 and locates the row in that column that corresponds to each save set name in the "Group Includes" list of the consistency group. For each save set name located in the "Name" column 521, the consistency group manager 223 then locates the client name in the "Client Name" column 523 of the consistency group information store 227 that is in the same row as the save set name and couples the client name to the save set name. In some embodiments, the consistency group manager 223 may also couple other entries from the same row of the consistency group information store 227 as the save set name for each save set in the consistency group, such as the entry from the "Set Data" column 525. The consistency group manager 223 then groups these coupled entries regarding each save set together into a consistency group information list similar to the one in column 503 of the consistency group information store 227 of FIG. 5a, and sends this consistency group information list back to the backup system 213 in response to the backup system 213's query requesting a consistency group information list as described in Block 421 of FIG. 4. When the backup system 213 receives this consistency group information list, this completes process described in Block 421.

The arrangement and titles of the columns of the consistency group information store 227 depicted in FIG. 5a and FIG. 5b are exemplary and not intended to limit the methods available for storing the information about the save sets and consistency groups in the consistency group information store 227. Any of the column titles may have different names. Some columns could be removed, rearranged, or merged with other columns. For example, in the embodiment of FIG. 5b, the "Group Includes" column 529 and the "Set Data" column 525 may be merged into a single column. Further, as discussed previously, the consistency group information store 227 need not be in the form of a table, but may instead be a database, a list, a matrix, an array, an arraylist, a tree, a hash, a flat file, an image, a queue, a heap, a memory, a stack, a set of registers, or any data structure that may hold data about one or more entities.

FIG. 6 is one embodiment of a user interface configured to create a save set and present an option to include the save set within a consistency group. In one embodiment, the user interface is presented as a window 601. In alternate embodiments, such a user interface could be in a command line, an operating system toggle, a smart phone application, or a page readable by a web browser. An input box for the save set name is illustrated in field 615. In alternate embodiments, this may look different or may be omitted entirely due to an automatic naming system. The contents of the save set are listed in field 613. For instance, in FIG. 6, the save set identified by the name "Save_Set_1" includes directories F:\, G:\, H:\, I:\, and J:\. In another embodiment, this interface could map out the directories on the client computer on which the save set is being created. An option allowing the save set to immediately become part of a consistency group is illustrated in checkbox 621. A selector for selecting which consistency group or consistency groups the save set is to be included into is illustrated in field 623. For instance, in FIG. 6, the save set identified by the name "Save_Set_1" is to be included in the consistency group identified by the consistency group name "purple." This type of user interface could be presented on the management console 111, or it could alternately be presented on one of the client computers 123.

In some embodiments, the user interface of FIG. 6 may be the origin of the consistency group creation request received by the backup system 213 described in Block 301 of FIG. 3. This occurs if the consistency group that the save set is made to join does not yet exist. It may also be the origin of a request to edit a consistency group, such as if a save set is created and is requested to be added to an existing consistency group.

The user interface illustrated by FIG. 6 is only an example and is not intended to limit the ways in which a consistency group can be created. While FIG. 6 illustrates the creation of or editing of a consistency group during save set creation, the creation of or editing of a consistency group can also take place after the save set already exists. In one embodiment, for example, a consistency group could be created or edited using a selection user interface that presents a list of already-existing save sets located on computers throughout the network 121.

FIG. 7 is one embodiment of a user interface configured to request a recovery operation over a consistency group and present an option to instead request the recovery operation over a subset of save sets within the consistency group. In one embodiment, this user interface would be presented on the management console 111 and would result in a consistency group operation request sent to the main server 101 as in step 401.

In one embodiment, the user interface is presented as a window 701. In alternate embodiments, such a user interface could be in a command line, an operating system toggle, a smart phone application, or a page readable by a web browser. The field 711 displays an overview of the consistency group, showing a tree structure of save set names identifying save sets included in the consistency group under the consistency group name. For instance, in FIG. 7, the consistency group identified by the consistency group name "purple" contains three save sets, identified by the save set names "Save_Set_1," "Save_Set_2," and "Save_Set_3." The field 711 further includes checkboxes to give the possibility to run the recovery operation over only a subset of the consistency group. For instance, in FIG. 7, the recovery operation would only be performed over a subset of the consistency group identified by the consistency group name "purple," and that subset would only include the save set identified by the save set name "Save_Set_2."

In relation to FIG. 4, the user interface in the specific embodiment of FIG. 7 would result in an entity operation request sent to the backup system 213 as described in Block 401. Because the subset only contains one save set, this could be identified in the process described in Block 401 and it could be treated as a save set operation request as described in Block 413 for the save set identified by the save set name "Save_Set_2," or it could be treated as a consistency group operation request as described in Block 421. The subset would then be identified in the process described in Block 441, which would lead to the consistency group manager 223 creating a subset list including only the save set identified by the save set name "Save_Set_2" during process described by Block 451.

While FIG. 7 illustrates a user interface for requesting a recovery operation, a similar user interface may be used to perform any of the other operations relating to backup previously mentioned in this Specification. The user interface of FIG. 7 is only an example and is not intended to limit the ways in which an operation may be requested through a user interface.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A method comprising:
receiving, by a consistency group manager executed by a processor, a consistency group operation request including a consistency group name identifying a consistency group that is to be backed up, wherein the consistency group is associated with a plurality of save sets that have been collectively assigned the consistency group name, and wherein each of the save sets is one or more data files or data file locations stored on a client computer that have been collectively assigned a save set name, and each save set is stored on one of a plurality of client computers collectively forming the consistency group;
querying a data structure by the consistency group manager, using the consistency group name, for a consistency group information list, wherein the data structure includes a plurality of entries, each entry being a consistency group entry corresponding to a consistency group or a save set entry corresponding to a save set, wherein each entry includes a name field, a client name field, a set data field, and a group include field, wherein the name field identifies a name of a consistency group or a save set, wherein the client name field specifies a name of a client computer that stores a save set specified in the name field if the corresponding entry is a save set entry, wherein the set data field specifies one or more files associated with the corresponding save set and file locations of the files, and wherein the group include field specifies a plurality of save sets if the corresponding entry is a consistency group entry, wherein querying the data structure for a consistency group information list comprises searching under the name field of the data structure based on the consistency group name to locate a first entry matching the consistency group name, obtaining a name of each of the plurality of save sets from the group include field of the first entry, for each of the names of the save sets, searching under the name field to locate an entry that matches the name of each save set, and including in the consistency group information list a client computer name from the client name field and data files from the data set field of the matching entry;

determining that a backup operation indicated by the consistency group operation request is to run over a subset of the plurality of save sets in the consistency group information list;

copying the consistency group information s into a subset list, and removing from the subset list one or more save sets that are not in the subset and one or more client computers corresponding to the one or more save sets; and sending, for each save set name in the subset list, a save set operation request to the client computer identified by the client computer name in the subset list, the save set operation request indicating that a backup is to be performed over the save set.

2. The method of claim 1, wherein the consistency group operation request and save set operation request indicate an action to be taken over the consistency group and save set, respectively, wherein the action is any one of recovering from a prior backup, destructively rolling back to a previously backed up state, purging or deleting backups, editing a backup retention and expiration policy, cloning a backup, staging a backup, renaming or otherwise editing metadata for a backup, receiving or sending a report or notification relating to the status of a backup operation, searching for specific data, or searching for a specific backup.

3. The method of claim 1, further comprising:
receiving a consistency group creation request indicating that a new consistency group should be created, wherein the consistency group creation request includes a new consistency group information list; and storing, through the consistency group manager, a new consistency group name coupled to the new consistency group information list, the new consistency group name identifying the new consistency group.

4. The method of claim 3, wherein the consistency group creation request is received from one of the client computers that contain the save sets.

5. The method of claim 3, wherein the consistency group creation request is received from a management console with a user interface.

6. The method of claim 1, wherein the client computers that contain the save sets are a collection of servers that work in concert to support an application that runs on the Internet or that runs on an intranet.

7. A system, comprising:
a network interface;
a memory having a data structure, the data structure storing one or more consistency group names, a plurality of save set data entries, and one or more consistency group information lists, each save set data entry including a list of files or file locations located on the client computer that are included in a save set;

a central processing unit coupled to the memory and the network interface; and a backup system containing a consistency group manager executed by the central processing unit to perform operations, the operations including receiving, by a consistency group manager executed by a processor, a consistency group operation request including a consistency group name identifying a consistency group that is to be backed up, wherein the consistency group is associated with a plurality of save sets that have been collectively assigned the consistency group name, and wherein each of the save sets is one or more data files or data file locations stored on a client computer that have been collectively assigned a save set name, and each save set is stored on one of a plurality of client computers collectively forming the consistency group;

querying the data structure by the consistency group manager, using the consistency group name, for a consistency group information list, wherein the data structure includes a plurality of entries, each entry being a consistency group entry corresponding to a consistency group or a save set entry corresponding to a save set, wherein each entry includes a name field, a client name field, a set data field, and a group include field, wherein the name field identifies a name of a consistency group or a save set, wherein the client name field specifies a name of a client computer that stores a save set specified in the name field if the corresponding entry is a save set entry, wherein the set data field specifies one or more files associated with the corresponding save set and file locations of the files, and wherein the group include field specifies a plurality of save sets if the corresponding entry is a consistency group entry, wherein querying tithe data structure for a consistency group information list comprises searching under the name field of the data structure based on the consistency group name to locate a first entry matching the consistency group name, obtaining a name of each of the plurality of save sets from the group include field of the first entry, for each of the names of the save sets, searching under the name field to locate an entry that matches the name of each save set, and including in the consistency group information list a client computer name from the client name field and data files from the data set field of the matching entry;

determining that a backup operation indicated by the consistency group operation request is to run over a subset of the plurality of save sets in the consistency group information list;

copying the consistency group information list into a subset list, and removing from the subset list one or more save sets that are not in the subset and one or more client computers corresponding to the one or more save sets; and sending, for each save set name in the subset list, a save set operation request to the client computer identified by the client computer name in the subset list, the save set operation request indicating that a backup is to be performed over the save set.

8. The system of claim 7, wherein the backup system is configured to receive a consistency group operation request indicating that an action is to be taken over the consistency group, and the consistency group manager is configured to send a save set operation request indicating that an action is to be taken over the save set, wherein the action is any one of recovering from a prior backup, destructively rolling back to a previously backed up state, purging or deleting backups, editing a backup retention and expiration policy, cloning a backup, staging a backup, renaming or otherwise editing metadata for a backup, receiving or sending a report or notification relating to the status of a backup operation, searching for specific data, or searching for a specific backup.

9. The system of claim 7, wherein backup system is further configured to receive a consistency group creation request indicating that a new consistency group should be created, wherein the consistency group creation request includes a new consistency group information list, and further wherein the consistency group manager is configured to store a new consistency group name coupled to the new consistency group information list, the new consistency group name identifying the new consistency group.

10. The system of claim 9, wherein the backup system is configured to receive the consistency group creation request from one of the client computers that contain the save sets.

11. The system of claim 9, wherein the backup system is configured to receive the consistency group creation request from a management console with a user interface.

12. The system of claim 7, wherein the client computers that contain the save sets are a collection of servers that work in concert to support an application that runs on the Internet or that runs on an intranet.

13. A non-transitory machine-readable medium having instructions stored therein, which when executed by a processor, cause the processor to perform operations, the operations comprising:

receiving, by a consistency group manager executed by a processor, a consistency group operation request including a consistency group name identifying a consistency group that is to be backed up, wherein the consistency group is associated with a plurality of save sets that have been collectively assigned the consistency group name, and wherein each of the save sets is one or more data files or data file locations stored on a client computer that have been collectively assigned a save set name, and each save set is stored on one of a plurality of client computers collectively forming the consistency group;

querying a data structure by the consistency group manager, using the consistency group name, for a consistency group information list, wherein the data structure includes a plurality of entries, each entry being a consistency group entry corresponding to a consistency group or a save set entry corresponding to a save set, wherein each entry includes a name field, a client name field, a set data field, and a group include field, wherein the name field identifies a name of a consistency group or a save set, wherein the client name field specifies a name of a client computer that stores a save set specified in the name field if the corresponding entry is a save set entry, wherein the set data field specifies one or more files associated with the corresponding save set and file locations of the files, and wherein the group include field specifies a plurality of save sets if the corresponding entry is a consistency group entry, wherein querying the data structure for a consistency group information list comprises searching under the name field of the data structure based on the consistency group name to locate a first entry matching the consistency group name, obtaining a name of each of the plurality of save sets from the group include field of the first entry, for each of the names of the save sets, searching under the name field to locate an entry that matches the name of each save set, and including in the consistency group information list a client computer name from the client name field and data files from the data set field of the matching entry;

determining that a backup operation indicated by the consistency group operation request is to run over a subset of the plurality of save sets in the consistency group information list;

copying the consistency group information list into a subset list, and removing from the subset list one or more save sets that are not in the subset and one or more client computers corresponding to the one or more save sets; and sending, for each save set name in the subset list, a save set operation request to the client computer identified by the client computer name in the subset list, the save set operation request indicating that a backup is to be performed over the save set.

14. The non-transitory machine-readable medium of claim 13, wherein the consistency group operation request and save set operation request indicate an action to be taken over the consistency group and save set, respectively, wherein the action is any one of recovering from a prior backup, destructively rolling back to a previously backed up state, purging or deleting backups, editing a backup retention and expiration policy, cloning a backup, staging a backup, renaming or otherwise editing metadata for a backup, receiving or sending a report or notification relating to the status of a backup operation, searching for specific data, or searching for a specific backup.

15. The non-transitory machine-readable medium of claim 13, wherein the operations further comprise:

receiving a consistency group creation request indicating that a new consistency group should be created, wherein the consistency group creation request includes a new consistency group information list; and storing, through the consistency group manager, a new consistency group name coupled to the new consistency group information list, the new consistency group name identifying the new consistency group.

16. The non-transitory machine-readable medium of claim 15, wherein the consistency group creation request is received from one of the client computers that contain the save sets.

17. The non-transitory machine-readable medium of claim 15, wherein the consistency group creation request is received from a management console with a user interface.

18. The non-transitory machine-readable medium of claim 13, wherein the client computers that contain the save sets are a collection of servers that work in concert to support an application that runs on the Internet or that runs on an intranet.

19. The method of claim 1, wherein each entry of the consistency group information store further comprises a set type field, wherein the set type field indicates whether the entry is associated with a save set entry or a consistency group entry.

20. The method of claim 19, wherein at least one save set is associated with a plurality of consistency groups.

21. The method of claim 1, wherein the subset of the save sets in the consistency group information list is selected via a logical view generated by the consistency group manager and displayed at a management console coupled to the consistency group manager.

22. The system of claim 7, wherein the subset of the save sets in the consistency group information list is selected via a logical view generated by the consistency group manager and displayed at a management console coupled to the consistency group manager.

23. The non-transitory machine-readable medium of claim 13, wherein the subset of the save sets in the consistency group information list is selected via a logical view generated by the consistency group manager and displayed at a management console coupled to the consistency group manager.

* * * * *